Patented June 29, 1948

2,444,215

UNITED STATES PATENT OFFICE 2,444,215

FLOUR-ENRICHING COMPOSITION

Robert S. Whiteside, Scarsdale, and Peter V. Kolb, Rye, N. Y., assignors, by mesne assignments, to Winthrop-Stearns Inc., New York, N. Y., a corporation of Delaware No Drawing. Application August 19, 1943, Serial No. 499,228

5 Claims. (Cl. 99—91)

Our present invention relates to the enrichment of flour and more particularly to a free-flowing stable composition through the medium of which flour can be enriched uniformly and to a desired extent without adversely affecting its ash value.

Attempts have been made in the past to enrich flour and while considerable progress has been made, the results fall considerably short of what is desired or required. One of the prior modes of enriching flour has been to add calcium sulphate as a filler with or without a very small amount of magnesium carbonate and to add certain amounts of iron, niacin, etc. Another method of enriching flour was to take a portion of the flour, add vitamins and minerals thereto and then reintroduce the mixture into the flour but this was unsatisfactory because the product was only usable for a very limited period. These practices had several disadvantages, from the point of view of the miller, including the lack of stability of the modified flour and the lack of homogeneity due to the imperfect distribution of the added materials in the relatively large quantity of flour. The lack of stability many times resulted in chemical change or loss of vitamins. The lack of homogeneity resulted in baked products which varied widely in their composition and the production of some baked products containing little or no enrichment. One of the reasons for this was the lumpiness which resulted from the poor physical qualities of the addition materials. Another important disadvantage lay in the undue increase of the ash value of the flour. This is not only highly objectionable from the miller's point of view, but actually causes financial loss due to the fact that flour, on one basis, is classified in accordance with its ash value and the use of calcium sulphate in any appreciable amount was enough to cause the flour to fall within the next lower standard of quality which commanded a lower price. The gypsum-like nature of calcium sulphate was itself objectionable and in general this mode of attempted enrichment left much to be desired even though it did accomplish some improvement in the underlying principle, namely, the enrichment of flour for the production of enriched bread and other products made from flour.

One of the major objects of our present invention is to overcome the defects and disadvantages of prior practices in connection with the attempted enrichment of flour and to make it possible to produce a stable enriched flour with advantages peculiar unto itself.

Another object of our invention is to provide for the first time a simple freeflowing composition containing all desired ingredients which can be very simply incorporated into the flour mill stream and which is capable of being readily homogeneously distributed throughout the flour mill stream so that every unit of baked product produced from such enriched flour is substantially identical, thus enabling standardization to be effected.

A further object of our invention is to overcome instability and rancidity while at the same time producing no ash increment in the flour due to the filler employed and an ash increment which is unobjectionable due to the addition of our composition in its entirety.

A still further object of our invention is to provide an enriching composition base with which may be incorporated any desired amounts of vitamins, iron and other ingredients of nutritive value and under such conditions that the composition base and the added nutritive ingredients can be readily dispersed uniformly throughout flour.

A still further object of our invention is to produce a flour-enriching composition which has such unusual free-flowing characteristics that it approaches the nature of a liquid in that respect.

Other and further objects and advantages will be appreciated by those skilled in this art or will be apparent or pointed out hereinafter.

In accordance with our present invention, we employ as the filler a material which adds nothing to the ash value of the flour in direct contrast with the calcium sulphate heretofore employed for that purpose. Our present procedure also represents a substantial departure from the practice of employing a portion of the flour itself as the vehicle for the vitamins and minerals. We have found that our filler must meet certain rigid specifications before it is suitable for use in our invention. The filler must not only not add appreciably to the ash value of the flour, but it must be fat-free or very substantially fat-free, must be of very low moisture content and must be in a physical state of subdivision equal to at least about 300 mesh. Even finer meshes are frequently desirable so that a dry, fat-free filler 100% of which will pass through a 320 mesh sieve, meets all requirements. As a result of much research and investigation, we have discovered that certain starches such as cornstarch and wheat starch are admirably adapted for the present purposes, corn starch being the preferred filler for use in our new flour-enriching composition. It is to be understood, however, that our invention is not limited to the use of corn starch or wheat starch or mixtures thereof but may include other starches which meet the specifications herein set forth, namely, freedom from fat, low moisture content and the ability to be reduced to a fineness of at least 300 mesh. Wheat starch has the economic disadvantage of being somewhat more expensive than cornstarch. Corn starch, wheat starch or other starches responding to the foregoing requirements have inherent in them unusually desirable free flowing characteristics when used for the present purposes, i. e. as an essential constituent of our new flour-enriching composition.

Our new flour-enriching composition also includes tricalcium phosphate, monocalcium phosphate and talc. The tricalcium phosphate and the talc enhance and supplement the free-flowing characteristics of our new flour-enriching composition. The addition of monocalcium phosphate is important for pH control and, as will be hereinafter more fully explained, the amount of monocalcium phosphate employed depends upon the over-all pH value desired in the composition. Tricalcium phosphate and talc are approximately neutral or slightly on the alkaline side and it is known that certain vitamins such as the vitamins B are stable only under acid conditions and therefore the monocalcium phosphate content of our flour-enriching composition is adjusted with relation to the particular vitamins employed in any particular composition so as to produce a pH value in aqueous solution or suspension at which the particular vitamins are most stable.

The starch, tricalcium phosphate, monocalcium phosphate and talc constitute what we have termed our flour-enriching base composition and to these can be added any other desirable ingredients having food or nutritive value such as vitamins and at least one assimilable mineral having nutritional value and selected from the group including iron, manganese, copper and iodine. In accordance with one particular example which is to be understood as constituting no limitation upon the metes and bounds of our invention a flour-enriching composition responding to our present invention is composed of the following ingredients in the following relative proportions by weight:

| | Grams |
|---|---|
| Starch, approximately | 17.6 |
| Tricalcium phosphate, approximately | .3 |
| Monocalcium phosphate, approximately | .9 |
| Talc, approximately | 1.0 |
| Thiamin (vitamin $B_1$), approximately | .3 |
| Niacin, approximately | .8 |
| Sodium iron pyrophosphate, approximately | 7.4 |
| Optional—Other vitamins including $B_2$ and D. | |

We have further discovered that the present objects can be fully realized with certain compositional variations in our aforesaid flour-enriching base composition which may be considered as a vehicle or carrier for introducing vitamins, assimilable iron and other ingredients into the flour to the desired extent and under such conditions as to avoid loss of stability and to avoid lumping and undesirable increments in the ash value of the flour after the addition of our composition thereto. In this connection, we may vary the amount of starch from approximately 5-98% of the base composition and on the same basis the amount of tricalcium phosphate may range from about .1-5%, the monocalcium phosphate may vary from .5-10% and the talc content may range from as little as about .25% to approximately 10%. Since talc primarily consists of magnesium trisilicate and magnesium carbonate we may, if we desire and without departing from the principle or scope hereof, employ these ingredients in place of talc although this has the economic disadvantage of greater cost. Where these ingredients are employed, however, we prefer to utilize approximately .25-10% each of the magnesium trisilicate and/or magnesium carbonate.

It is to be understood that the starch in each case is the residual percentage necessary to bring the composition to the desired volume and/or strength and in this connection the preferred composition set forth above is added to the flour mill stream at any time when it will become freely mixed with the rather rapidly traveling stream of flour and preferably before the flour passes through the conventional screw conveyor and rebolter. It is to be understood further that in the case of flour which is already completely processed and ready for market, our new composition may be admixed with that flour in a batch mixer or in any apparatus or equipment in which a uniform distribution of the composition in the flour can be achieved. A composition such as has been described above is added to flour in the proportion of about ½–4 ounces of the complete flour-enriching composition to each 200 pounds of flour but this is to be understood as exemplary only and not as a limitation upon the invention. It will still further be appreciated that the homogeneous distribution of one-half ounce of material in 200 pounds of flour is itself a difficult problem and yet our present composition has such unusual free-flowing characteristics that it seems to permeate the flour in a manner almost analogous to a capillary action. This comparison aids in understanding the almost liquid-like free-flowing nature of our present composition, every particle of which is at least as fine as 300 mesh and frequently as fine as 320 mesh or even finer.

The flour-enriching composition as a whole is also characterized by the fact that in aqueous solution or suspension it has a pH value on the acid side, that is, less than 7. The preferred composition set forth above has a pH value of approximately 4.5 and while our invention comprehends any pH value less than 7 we have further discovered that a pH value ranging from approximately 3.5-4.5 is the best and therefore this range of pH values forms a definite although more limited aspect of our invention. It will be appreciated that the precise amount and quantity of vitamins and other supplemental ingredients which is employed is subject to suitable variations. In some instances enough will be added to bring about a predetermined minimum enrichment of the flour or the baked products produced therefrom. In other instances, the extent of enrichment can be raised or lowered to suit any given purpose. In some instances it might only be necessary to supplement, via the baked flour products, a dietary deficiency the main values or amounts of which are produced or furnished from other sources. In some instances, however, it is conceivable that the entire dietary requirement can be furnished through a highly enriched flour or the bread or other baked product produced therefrom. While we have particularly mentioned vitamin $B_1$, vitamin $B_2$ and niacin, vitamin D having been also referred to, it is to be understood that if we so desire other vitamins can be incorporated in our flour enriching composition and that our composition may be used for the production of other food products made directly or indirectly with flour as well as those products not containing flour, such as confections, ice-cream, other food products and animal feeds. Depending upon the particular use of the composition and the amount of enrichment to be effected, we may vary the percentage composition of the composition itself, or we may equally well vary the amount of the composition which is utilized per unit of weight or volume of the material to be enriched. This latter is the preferable way to effect variations in enrichment because it enables one standardized composition to be made and used for many different purposes, thus keeping down the cost of the enrichment program and aiding in the mass production of the composition.

It is to be understood that the foregoing is presented as illustrative and not as limitative and that other and further additions, omissions, substitutions and modifications may be made within the terms of the appended claims without departing from the invention. We may also, if we desire, employ tricalcium phosphate and/or magnesium carbonate in lieu of any desired proportion of the talc component hereinabove referred to.

The word talc as employed herein is used in a generic sense and while it consists predominantly of magnesium silicate, it frequently contains, before purification, magnesium carbonate and salts of aluminum, iron and calcium, and, in addition, compounds of magnesium other than the silicate and carbonate.

We claim:

1. A stable, free-flowing enriching composition base of the character described containing fat-free, low moisture ashless starch filler, talc, tricalcium phosphate and monocalcium phosphate and being in the form of a substantially anhydrous homogeneous powder of at least about 300 mesh.

2. A stable, free-flowing enriching composition base of the character described containing about 5–98% cornstarch, about 0.25–10% talc, about 0.1–10% tricalcium phosphate and about 0.5–10% monocalcium phosphate and being in the form of a substantially anhydrous powder of at least about 300 mesh.

3. A stable, free-flowing flour-enriching composition comprising, the following ingredients in approximately the following proportions, by weight: about 17.6 parts fat-free, low moisture starch, about 1 part talc, about 0.3 part tricalcium phosphate, about 0.9 part monocalcium phosphate, at least about 0.3 part of vitamin $B_1$, at least about 0.8 part niacin and about 7.4 parts of sodium iron pyrophosphate, said composition being in the form of a substantially anhydrous powder of at least about 300 mesh.

4. A stable, free-flowing flour-enriching composition comprising fat-free, low moisture ashless starch filler, talc, tricalcium phosphate, monocalcium phosphate, vitamins $B_1$, $B_2$ and D, and niacin, and assimilable iron in the form of a substantially anhydrous homogeneous powder of at least about 300 mesh.

5. A stable, free-flowing flour-enriching composition comprising fat-free, low moisture starch, talc, tricalcium phosphate, monocalcium phosphate, vitamins and assimilable iron in the form of a substantially anhydrous homogeneous powder of at least about 300 mesh in such proportions that an aqueous solution or suspension of the composition has a pH value below 7.

ROBERT S. WHITESIDE.
PETER V. KOLB.

REFERENCES CITED

The following references are of record in the file of this patent:

UNITED STATES PATENTS

| Number | Name | Date |
| --- | --- | --- |
| 1,158,934 | Kohman | Nov. 2, 1915 |
| 2,166,797 | Collatz | July 18, 1939 |
| 2,239,543 | Andrews | Apr. 22, 1941 |
| 2,259,543 | Billings | Oct. 21, 1941 |
| 2,357,069 | Barackman | Aug. 29, 1944 |

FOREIGN PATENTS

| Number | Country | Date |
| --- | --- | --- |
| 379,412 | Great Britain | 1931 |
| 522,418 | Great Britain | 1938 |